United States Patent

Watanabe

[15] 3,671,671

[45] June 20, 1972

[54] PULSE TRANSMITTING AND RECEIVING SYSTEMS

[72] Inventor: Kazutaka Watanabe, Toyko, Japan

[73] Assignee: Yokogawa Electric Works, Ltd., Toyko, Japan

[22] Filed: June 10, 1970

[21] Appl. No.: 44,944

[30] Foreign Application Priority Data

June 13, 1969 Japan..................................44/46551

[52] U.S. Cl. ..............................................178/68, 178/69 R

[51] Int. Cl. .........................................................H04l 25/00

[58] Field of Search................178/66, 68, 70 R, 70 TS, 69 R, 178/88; 330/30 R, 30 D, 13, 14

[56] References Cited

UNITED STATES PATENTS 3,381,089 4/1968 Delanoy et al...........................178/70
3,541,239 11/1970 Reid .......................................178/68
3,187,260 6/1965 Dove.......................................178/68 X
3,381,090 4/1968 Dorrell et al............................178/70

*Primary Examiner*—Benedict V. Safourek
*Attorney*—Chittick, Pfund, Birch, Samuels & Gauthier

[57] ABSTRACT

A pulse transmitting and receiving system comprises a transmission circuit including a balanced pair transmission line, impedances having the same characteristic impedance as the transmission circuit and connected on the opposite ends thereof, a pulse transmission circuit connected across the transmission lines so as to cause currents of equal magnitude but of opposite polarities to flow through transmission lines and a pulse receiving circuit including a differential amplifier responsive to the variation in the potentials of the transmission lines caused by the flow of the currents.

5 Claims, 5 Drawing Figures

PULSE TRANSMITTING AND RECEIVING SYSTEMS

BACKGROUND OF THE INVENTION

This invention relates to a pulse transmitting and receiving system and more particularly to a system wherein a plurality of pulse transmitting circuits and receiving circuits are connected to a single transmission line to transmit and receive pulse signals.

SUMMARY OF THE INVENTION

It is an object of this invention to provide a novel balanced pulse transmitting and receiving system capable of transmitting pulse signals without cross talk noise.

Another object of this invention is to provide a novel balanced pulse transmitting and receiving system of simplified circuit construction.

Further object of this invention is to provide a novel pulse transmitting and receiving system requiring only one type of source.

According to this invention there is provided a pulse transmitting and receiving system comprising a transmission circuit including a pair of balanced transmission lines, impedances having the same characteristic impedance as the transmission circuit and connected on the opposite ends thereof, a pulse transmission circuit connected across the transmission lines so as to cause currents of equal amplitude but of the opposite polarities to flow through transmission lines, and a pulse receiving circuit including a differential amplifier responsive to the variation in the potentials of the transmission lines caused by the flow of the currents. A plurality of such pulse transmission circuits and pulse receiving circuits may be connected to the same transmission circuit without causing cross talk noise.

BRIEF DESCRIPTION OF THE DRAWINGS

In the accompanying drawings.

DESCRIPTION OF THE PREFERRED EMBODIMENT

Figure 1:
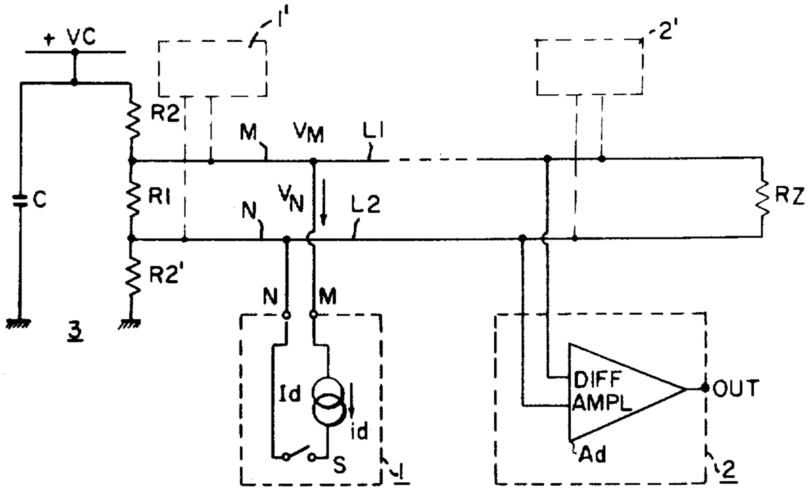
FIG.1 is a block diagram of one example of the pulse transmitting and receiving system embodying this invention.

With reference now to FIG.1 of the accompanying drawing balanced transmission lines $L_1$ and $L_2$ are connected to a pulse transmitting circuit 1 comprising a source of constant current $I_d$ and a switch S. A pulse receiving circuit 2 comprising a differential amplifier $A_d$ is also connected across transmission lines $L_1$ and $L_2$. A bias circuit comprising resistors $R_1$, $R_2$, $R_2'$, capacitor C and a source of direct current $V_c$ is connected at one end of the transmission lines $L_1$ and $L_2$.

More particularly resistors $R_2$, $R_1$ and $R_2'$ are connected in series across DC source $V_c$ and capacitor C is connected in parallel with serially connected resistors $R_2$, $R_1$ and $R_2'$. Transmission lines $L_1$ and $L_2$ are connected to the opposite terminals of resistor $R_1$ and the opposite ends of the transmission lines are terminated with a resistor $R_Z$.

The pulse transmitting and receiving circuit shown in FIG. 1 operates as follows. Transmission lines $L_1$ and $L_2$ are constructed as balanced lines. For example, they are comprised by stranded wires or a balanced type coaxial cable. Assuming that the transmission lines have a characteristic impedance $Z_o$ then resistor $R_Z$ is selected to have a resistance equal to $Z_o$. Resistors $R_1$, $R_2$ and $R_2'$ of the bias circuit 3 are selected to have resistances of a relation $R_1/2R_2 = Z_o$ and $R_2 = R_2'$. In this manner, the impedance is matched on both ends of transmission lines $L_1$ and $L_2$ so that there is no reflection of the signal at each end.

In bias circuit 3 the voltage of the DC source $V_c$ is divided among resistors $R_1$, $R_2$ and $R_2'$ and the voltage across resistor $R_1$ is applied between transmission lines $L_1$ and $L_2$. Assuming that $V_M$ represents the voltage at a point M on line $L_1$ and $V_N$ that of a point N on line $L_2$ then the following relations hold $$V_M = (R1+R2)/(R1+2R2) \cdot V_c$$

$$V_N = (R2)/(R+2R2) \cdot V_c$$

$$\text{where } R = (R1 \cdot RZ)/(R1+RZ)$$

The potential difference between points M and N is expressed by $$V_M - V_N = (R)/(R+2R2) \cdot V_c$$

Figure 3:
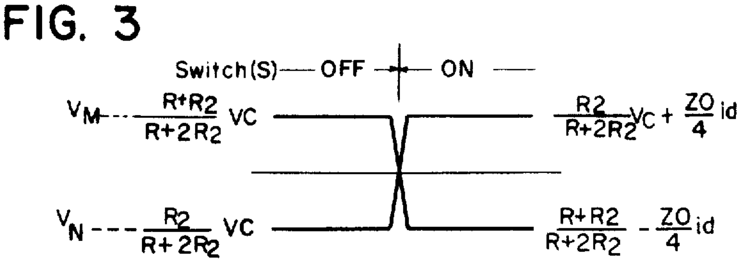

In the pulse transmitting circuit 1, the current from the source of constant current is repeatedly interrupted by switch S to supply a pulse to transmission lines $L_1$ and $L_2$. When the switch S is closed, current $i_d$ flows through transmission lines $L_1$ and $L_2$ (neglecting line resistance) with a polarity shown by arrows in FIG.2A so as to decrease the potential $V_M$ at M by $Zo/4 \cdot i_d$ and to increase the potential $V_N$ at N by the same amount. Therefore, where current $i_d$ from the source of constant current $I_d$ or resistors $R_1$, $R_2$ and $R_2'$ of bias circuit 3 are selected to satisfy the relation $$Zo/4 \cdot i_d = (R)/(R+2R2) \cdot V_c$$

repeated ON, OFF operations of switch S in the pulse transmission circuit 1 apply signals to points M and N on lines $L_1$ and $L_2$, said signals having opposite polarities but equal amplitudes as diagrammatically shown in Fig.3.

In the pulse receiving circuit 2, the above described variation in the potential of lines $L_1$ and $L_2$ created by the signals sent from pulse transmitting circuit 1 is detected by the differential amplifier $A_d$, whereby the signals are received. This differential amplifier operates to reverse the polarity of the output signal at a threshold value corresponding to zero potential difference of differential signals across the input terminals. For this reason, it is necessary to maintain the pulse receiving circuit 2 at a stable condition even when switch S is OFF and no current signal is being applied to lines $L_1$ and $L_2$. The bias voltage across lines $L_1$ and $L_2$ from resistor $R_1$ of the bias circuit 3 prevents the potential difference across lines $L_1$ and $L_2$ from dropping to zero even in the absence of the signal, as shown in FIG.3 However, it is to be understood that where a differential amplifier $A_d$ is used in which its threshold value can be set to any value other than zero volt, it is not necessary to use the bias circuit 3.

Figure 2A:
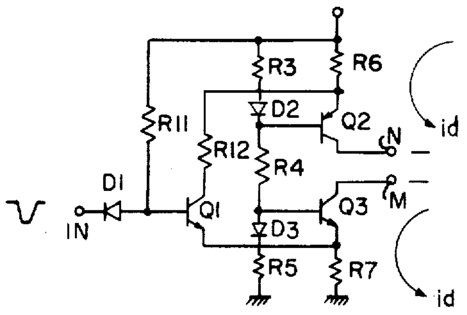
FIGS. 2A and 2B are connection diagrams to show examples of a pulse transmitting circuit and a pulse receiving circuit utilized in this invention and FIG.3 shows waveforms to explain the operation of this invention.
Figure 2B:
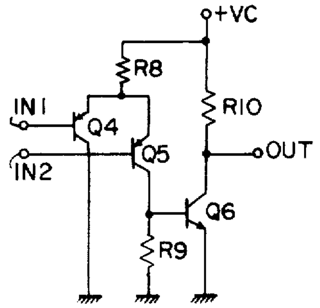

FIGS. 2A and 2B show details of the connections of a pulse transmitting circuit and a pulse receiving circuit suitable to use in this invention. In the pulse transmitting circuit shown in FIG. 2A, reference letter $Q_1$ represents a switching transistor acting as switch S shown in FIG.1. A PNP-type transistor $Q_2$ and a NPN-type transistor $Q_3$ cooperate respectively with resistors $R_3$, $R_4$ and a diode $D_2$; resistors $R_5$, $R_7$ and a diode $D_3$ to form constant current circuits. IN represents a signal input terminal and N and M signal output terminals. Base electrodes of transistors $Q_2$ and $Q_3$ are normally supplied with a constant bias voltage by resistors $R_3$, $R_4$ and $R_5$ and temperature compensating diodes $D_2$ and $D_3$.

Where input terminal IN is at said predetermined high potential level $V_M$(in FIG.3) and diode $D_1$ is reversely biased transistor $Q_1$ turns ON but there is no output across output terminals M and N because the emitter currents of transistors $Q_2$ and $Q_3$ are biased by resistor $R_2$ and resistor $R_{12}$ is set to a value to prevent these currents from flowing through transistors $Q_2$ and $Q_3$. When a signal is impressed upon input terminal IN to bring it to said predermined potential level $V_N$ (in FIG.3) transistor $Q_1$ turns OFF whereas transistor $Q_2$ and $Q_3$ turn ON to pass constant current $i_d$ through respective collector electrodes thus sending a pulse signal. Resistors $R_3$, $R_5$, $R_6$ and $R_7$ are adjusted to make equal the outgoing current from terminal N and the incoming current to terminal M.

As shown in FIG.2B one example of the differential amplifier of the receiving circuit comprises PNP-type transistors $Q_4$ and $Q_5$, a NPN-type transistor $Q_6$, resistors $R_8$ through $R_{10}$, input terminals $IN_1$ and $IN_2$ for differential signals and an output terminal OUT. Transistors $Q_4$ and $Q_5$ are turned ON and OFF by the signals impressed upon differential signal input terminals $IN_1$ and $IN_2$ and the output transistor $Q_6$ is turned ON and OFF in accordance with the change in the collector current of transistor $Q_5$ caused by the ON, OFF operations of transistors $Q_4$ and $Q_5$ to produce a signal on the output terminal OUT.

While in the above embodiment only one pulse transmitting circuit 1 and only one pulse receiving circuit 2 are connected to transmission lines $L_1$ and $L_2$, since transmitting circuit 1 is OFF when it is in the inoperative state and does not interfere with the operation of other pulse transmitting circuits it is obvious that any desired additional number of such transmitting circuits 1' may be connected across lines at any desired points along them. Further as it is possible to make sufficiently high the input impedance of the pulse receiving circuit relative to the characteristic impedance of the transmission lines, a plurality of such receiving circuits 2, 2' can also be connected across the lines. For this reason, this invention enables the to transmit signals between a plurality of transmitting and receiving circuits over a single transmission circuit.

As can be clearly noted from the foregoing description that since this invention utilizes balanced lines for the transmission circuit it is easy to balance currents flowing through two lines thus assuring stable transmission of pulse signals without accompanying cross talk noise. Further, since only one bias source is required circuit construction can be simplified. For this reason the novel pulse transmitting and receiving circuit is suitable for use in pulse transmission circuits of various types.

While the invention has been shown and described in terms of a preferred embodiment thereof it will be understood that many changes and modifications may be made without departing from the true spirit and scope of the invention as defined in the appended claims.

What is claimed is:

1. A pulse transmitting and receiving system comprising a transmission circuit including a balanced pair transmission line, impedances having the same characteristic impedance as said transmission line and connected on the opposite ends of said line, bias circuit means for normally biasing the conductors of said transmission line at predetermined different voltage levels, a pulse transmission circuit including constant current source means connected across said transmission line and selectively operable for supplying a constant value of current to the low voltage level conductor and receiving the same value of current from the high voltage level conductor of said line, and a pulse receiving circuit including a differential amplifier responsive to the variation in the potentials between conductors of said transmission line created by the flow of said current, said system adapted to invert the voltage level of said conductors upon selective supplying of constant current from said source means to and from said conductors.

2. The pulse transmitting and receiving system according to claim 1 wherein a plurality of pulse transmission circuits and a plurality of pulse receiving circuits are connected to said balanced transmission circuit.

3. The pulse transmitting and receiving system according to claim 1 wherein said pulse transmission circuit comprises a switching transistor turned ON and OFF by a pulse signal, and two complimentary transistors rendered ON and OFF by the operation of said switching transistor, each of said complimentary transistors comprising a constant current circuit and being connected to a different one of said conductors of said transmission line.

4. The pulse transmitting and receiving system according to claim 1 wherein said pulse receiving circuit comprises a differential amplifier constituted by a pair of transistors, the emitter electrodes thereof are connected in common, the base electrodes are connected to receive differential signals from said conductors and one of the collector electrodes is connected to an output terminal.

5. The pulse transmitting and receiving system according to claim 3 and wherein said pulse receiving circuit comprises a differential amplifier constituted by a pair of transistors, the emitter electrodes thereof are connected in common, the base electrodes are connected to receive differential signals from said conductors and one of the collector electrodes is connected to an output terminal.

* * * * *